(12) United States Patent
Sugawara

(10) Patent No.: US 11,537,008 B2
(45) Date of Patent: Dec. 27, 2022

(54) OPTICAL ELEMENT, LIQUID CRYSTAL DISPLAY DEVICE, AND PROJECTION-TYPE IMAGE DISPLAY DEVICE

(71) Applicant: Dexerials Corporation, Tokyo (JP)

(72) Inventor: Junichi Sugawara, Tokyo (JP)

(73) Assignee: Dexerials Corporation, Tokyo (JP)

( * ) Notice: Subject to any disclaimer, the term of this patent is extended or adjusted under 35 U.S.C. 154(b) by 301 days.

(21) Appl. No.: 16/561,808

(22) Filed: Sep. 5, 2019

(65) Prior Publication Data

US 2020/0081287 A1 Mar. 12, 2020

(30) Foreign Application Priority Data

Sep. 7, 2018 (JP) .............................. JP2018-167691

(51) Int. Cl.
*G02F 1/13363* (2006.01)
*G02F 1/1335* (2006.01)
(Continued)

(52) U.S. Cl.
CPC .......... *G02F 1/13363* (2013.01); *G02B 1/115* (2013.01); *G02B 1/118* (2013.01); *G02B 5/3008* (2013.01); *G02F 1/133528* (2013.01)

(58) Field of Classification Search
CPC ........... G02F 1/13363; G02F 1/133528; G02F 1/133548; G02F 1/133632; G02F 2413/02; G02F 1/133634; G02F 1/136277; G02F 2413/07; G02F 2413/03; G02F 2413/105; G02F 1/133531; G02F 1/13712; G02B 1/118; G02B 1/115; G02B 5/3008; G02B 5/3058; G02B 5/3016; B29D 11/0073; B29D 11/00644; G03B 21/006
See application file for complete search history.

(56) References Cited

U.S. PATENT DOCUMENTS 4,289,381 A * 9/1981 Garvin ................. G02B 5/3058
359/485.05
2004/0141122 A1 * 7/2004 Nakagawa .......... G02F 1/13363
349/117
(Continued)

FOREIGN PATENT DOCUMENTS

JP 2008-527401 A 7/2008
JP 2008-216956 A 9/2008
(Continued)

OTHER PUBLICATIONS

Office Action issued in the Japanese Patent Application No. 2018-167691, dated Aug. 30, 2022 (9 pages).
(Continued)

*Primary Examiner* — Anthony J Frost
(74) *Attorney, Agent, or Firm* — Osha Bergman Watanabe & Burton LLP

(57) ABSTRACT

Provided is an optical element which significantly reduces arrangement space, has superior durability, and also enables increased costs to be curbed. Functions of a polarizer and a phase difference compensation element are integrated. Specifically, the optical element has a transparent substrate, and a polarizer on one side of the transparent substrate, and has a phase difference compensation element on a side of the transparent substrate opposite from the polarizer.

15 Claims, 5 Drawing Sheets

(51) Int. Cl.
*G02B 1/118* (2015.01)
*G02B 1/115* (2015.01)
*G02B 5/30* (2006.01)

(56) References Cited

U.S. PATENT DOCUMENTS

| | | | |
|---|---|---|---|
| 2007/0141243 A1* | 6/2007 | Bell | B29D 11/0073 |
| | | | 427/163.1 |
| 2008/0258614 A1 | 10/2008 | Ha et al. | |
| 2008/0278811 A1* | 11/2008 | Perkins | G02B 5/3058 |
| | | | 359/485.05 |
| 2009/0128719 A1* | 5/2009 | Tateno | G02F 1/133634 |
| | | | 349/8 |
| 2009/0244412 A1 | 10/2009 | Tsukagoshi | |
| 2011/0032475 A1 | 2/2011 | Watanabe et al. | |
| 2012/0293732 A1 | 11/2012 | Koike et al. | |
| 2015/0015948 A1 | 1/2015 | Takada et al. | |
| 2015/0192723 A1* | 7/2015 | Takahashi | G02F 1/133634 |
| | | | 359/489.03 |
| 2016/0266282 A1 | 9/2016 | Oowada | |
| 2018/0224589 A1 | 8/2018 | Takada et al. | |
| 2020/0089048 A1 | 3/2020 | Awaya et al. | |

FOREIGN PATENT DOCUMENTS

| | | |
|---|---|---|
| JP | 2009-145863 A | 7/2009 |
| JP | 2011-053660 A | 3/2011 |
| JP | 2012-242449 A | 12/2012 |
| JP | 2015-034959 A | 2/2015 |
| JP | 2015-082010 A | 4/2015 |
| JP | 2018-128665 A | 8/2018 |
| WO | 2006/081006 A2 | 8/2006 |
| WO | 2008/081919 A1 | 7/2008 |
| WO | 2018/105586 A1 | 6/2018 |

OTHER PUBLICATIONS

Notice of Opinion on the First Review issued in Chinese Application No. 201910783655.3 dated Sep. 29, 2022 (24 pages).

* cited by examiner

OPTICAL ELEMENT, LIQUID CRYSTAL DISPLAY DEVICE, AND PROJECTION-TYPE IMAGE DISPLAY DEVICE

This application is based on and claims the benefit of priority from Japanese Patent Application No. 2018-167691, filed on 7 Sep. 2018, the content of which is incorporated herein by reference.

BACKGROUND OF THE INVENTION

Field of the Invention

The present invention relates to an optical element, a liquid crystal display device, and a projection-type image display device.

Related Art

For a liquid crystal display device, the disposition of a polarizing plate on a liquid crystal panel is essential based on the image formation principle. Furthermore, to improve contrast and viewing angle characteristics, optical compensation technology that uses a phase difference compensation plate is utilized in liquid crystal display devices.

As a polarizing plate that is used in a liquid crystal display device, an absorption-type wire grid-type polarizing plate which cancels out light that has been reflected by a metal grid by means of an interference effect and transmits another polarized light component by forming, on a substrate, a metal grid which has a smaller pitch than the wavelength of working bandwidth light and forming a dielectric layer and an inorganic fine particle layer on the metal grid, for example, has been proposed (see Patent Document 1).

Further, as optical compensation technology, a method of implementing optical compensation by using two phase difference compensation plates which are formed by oblique vapor deposition films, for example, has been proposed (see Patent Document 2). According to the optical compensation method disclosed in Patent Document 2, the contrast is improved by rotating the two phase difference compensation plates in an in-plane direction and adjusting the relative angle to an optimal position.

In addition, a liquid crystal display device that uses a phase difference compensation plate which includes at least two compensation layers which are disposed and stuck together such that the phase difference value and in-plane optical axis directions thereof are different has been proposed (see Patent Document 3).

However, in recent years, miniaturization of liquid crystal display devices has advanced, and the space for disposing the polarizing plates and phase difference compensation plates is becoming inadequate. Therefore, according to the optical compensation method disclosed in Patent Document 2, because two phase difference compensation plates and a rotation mechanism for rotating the two phase difference compensation plates are required, an increase in installation space is a concern, and dealing with miniaturization is difficult.

The phase difference compensation plate disclosed in Patent Document 3 requires an adhesive because the same is formed by pasting together the two compensation layers, and there is a problem with durability. Moreover, because two substrates are required, there are also concerns about increased costs.

Patent Document 1: Japanese Unexamined Patent Application, Publication No. 2008-216956
Patent Document 2: Japanese Unexamined Patent Application, Publication No. 2009-145863
Patent Document 3: PCT International Publication No. WO2008/081919

SUMMARY OF THE INVENTION

The present invention was conceived in view of the foregoing background art, and an object of the present invention is to provide an optical element which significantly reduces arrangement space, has superior durability, and also enables increased costs to be curbed.

The present inventors noted that, if the functions of the polarizing plate and phase difference compensation plate are integrated, an optical element is realized which, while significantly reducing arrangement space, has superior durability and enables increased costs to be curbed. The present inventors thus succeeded in completing the present invention.

In other words, the present invention is an optical element which includes a transparent substrate, and a polarizer on one side of the transparent substrate, and includes a phase difference compensation element on a side of the transparent substrate opposite from the polarizer.

The polarizer may have a wire grid structure and include a grid-shaped convex portion which is arranged on the transparent substrate at a pitch shorter than a wavelength of light in a used bandwidth, and extends in a predetermined direction.

The grid-shaped convex portion may include a linear metal layer, a first dielectric layer, and an absorption layer, in that order starting on the transparent substrate side.

The first dielectric layer may be a Si oxide or an Al oxide.

The grid-shaped convex portion may also include a linear metal layer and a dielectric absorption layer, in that order starting on the transparent substrate side.

The linear metal layer may be at least one element selected from a group consisting of Al, Ag, Cu, Mo, Cr, Ti, Ni, W, Fe, Si, Ge, Te and alloys formed of two or more thereof.

At least a portion of the surface of the grid-shaped convex portion may also be covered by a second dielectric layer.

A water repellent layer may also be provided on the second dielectric layer.

The phase difference compensation element may include at least an optically anisotropic layer which includes a plurality of birefringent films whereon inorganic material is deposited, and a matching layer having a phase difference.

The birefringent films may be oblique vapor deposition films.

The inorganic material may be an oxide containing at least one element selected from a group consisting of Si, Nb, Zr, Ti, La, Ta, Al, Hf, and Ce.

The matching layer having a phase difference may be a dielectric film laminated body formed of dielectrics of two or more types having different refractive indices.

The dielectric film may include at least one element selected from a group consisting of $TiO_2$, $SiO_2$, $Ta_2O_5$, $Al_2O_3$, $CeO_2$, $ZrO_2$, $ZrO$, $Nb_2O_5$, and $HfO_2$.

The dielectric film may further include an antireflection layer.

The phase difference compensation element may include a protective layer between the optically anisotropic layer and the antireflection layer.

The transparent substrate may be one material selected from a group consisting of glass, quartz crystal, sapphire.

In addition, another present invention is a liquid crystal display device which includes a VA-mode liquid crystal cell and the foregoing optical element.

Furthermore, another present invention is a projection-type image display device that includes a light source that emits light; a projection optical system that projects modulated light; and the foregoing liquid crystal display device which is disposed in an optical path between the light source and the projection optical system.

The optical element of the present invention combines the functions of both a polarizer and a phase difference compensation element, and therefore, in a projection-type image display device which incorporates a liquid crystal display device, for example, the optical element significantly reduces arrangement space, enables a reduction in the number of parts to be achieved, and enables increased costs to be curbed. In addition, the optical element of the present invention enables a reduction in man-hours spent tuning a phase difference compensation element. Furthermore, the optical element of the present invention is principally formed of inorganic materials, and therefore has superior durability and resistance to heat.

DETAILED DESCRIPTION OF THE INVENTION

An embodiment of the present invention will be explained hereinbelow with reference to the drawings.
[Optical Element]
The optical element of the present invention includes a transparent substrate, and a polarizer on one side of the transparent substrate, and includes a phase difference compensation element on a side of the transparent substrate opposite from the polarizer. Note that, unless detrimental to the effects of the present invention, the optical element of the present invention may also include another layer between the transparent substrate and the polarizer or between the transparent substrate and the phase difference compensation element.

Figure 1:
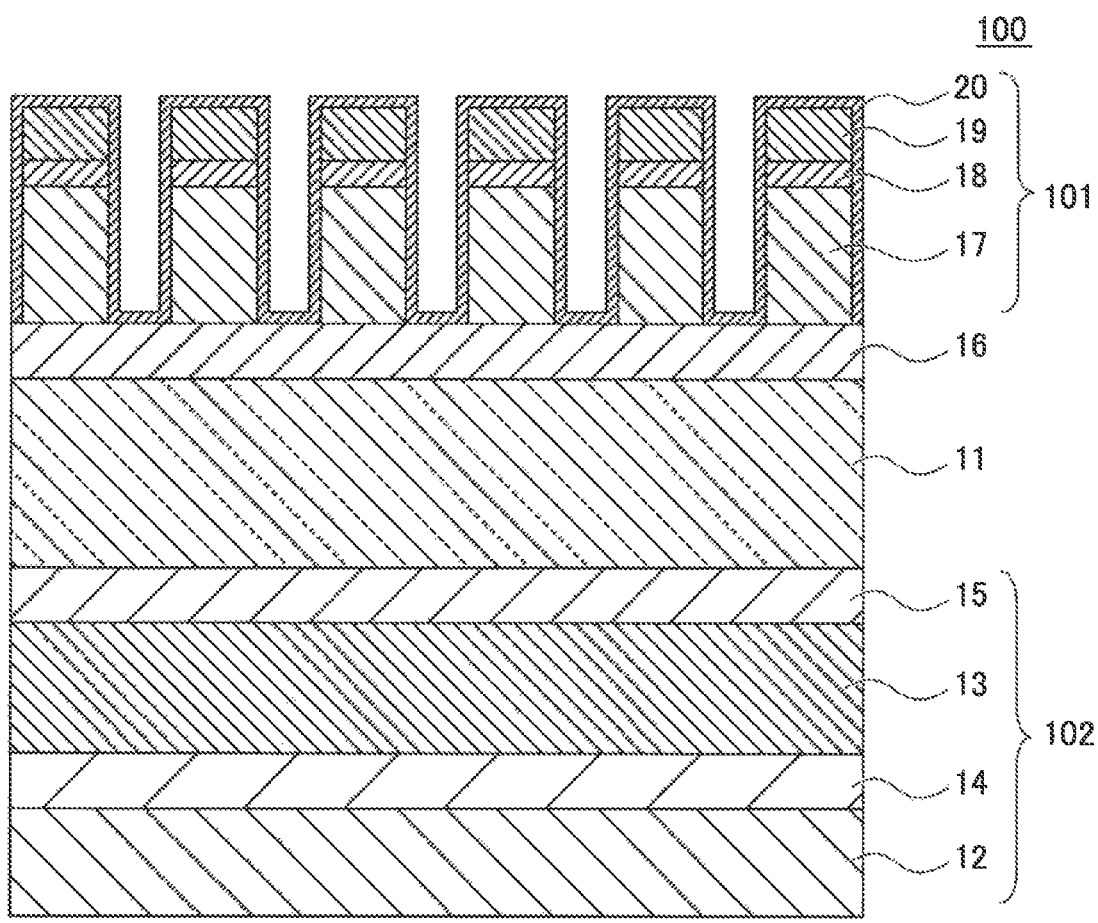
FIG. 1 is a cross-sectional schematic diagram of an optical element according to an embodiment of the present invention.

FIG. 1 is a cross-sectional schematic diagram illustrating an optical element 100 according to an embodiment of the present invention. The optical element 100 illustrated in FIG. 1 includes a transparent substrate 11, and a polarizer 101 on one side of the transparent substrate 11, and includes a phase difference compensation element 102 on a side of the transparent substrate 11 opposite from the polarizer 101.

The polarizer 101 constituting the optical element 100 illustrated in FIG. 1 has a grid-shaped convex portion arranged at a pitch shorter than a wavelength of light in a used bandwidth, and the grid-shaped convex portion includes a third dielectric layer 16, a linear metal layer 17, a first dielectric layer 18, an absorption layer 19, and a second dielectric layer 20, in that order starting on the side of the transparent substrate 11. That is, the polarizer 101 has a wire grid structure in which the grid-shaped convex portion is arranged in a one-dimensional grid shape on the transparent substrate 11, the grid-shaped convex portion having the linear metal layer 17, the first dielectric layer 18, the absorption layer 19, and the second dielectric layer 20 laminated in that order starting on the side of the transparent substrate 11.

The phase difference compensation element 102 constituting the optical element 100 illustrated in FIG. 1 has an antireflection layer 12, an optically anisotropic layer 13, a protective layer 14, and a matching layer having a phase difference 15.
(Transparent Substrate)
There are no particular limitations on the transparent substrate (the transparent substrate 11 in FIG. 1) as long as the same is a substrate that exhibits translucence to working bandwidth light, and the transparent substrate can be suitably selected according to the objective. "Exhibits translucence to working bandwidth light" does not mean that the transmittance of working bandwidth light is 100%, but rather that translucence may be exhibited which enables polarizer functions to be retained. Possible examples of working bandwidth light include visible light of a wavelength on the order of 380 nm to 810 nm.

There are no particular limitations on the shape of the main face of the transparent substrate, and a shape corresponding to the objective (a rectangular shape, for example) is suitably selected. The average thickness of the transparent substrate is preferably from 0.3 mm to 1 mm, for example.

As the material constituting the transparent substrate, a material with a refractive index from 1.1 to 2.2 is preferable, of which glass, quartz crystal, sapphire, and the like, are possible examples. From the perspective of cost and translucence, glass, and in particular quartz glass (refractive index of 1.46) or soda-lime glass (refractive index of 1.51) is preferably used. There are no particular limitations on the component composition of the glass material, and a low-cost glass material such as silicate glass, which is widely available, can be used as the optical glass, for example.

In addition, from the perspective of thermal conductivity, quartz crystal or sapphire, which has a high thermal conductivity, is preferably used. Accordingly, a polarizer for an optical engine of a projector with high heat dissipation and with which high light resistance to strong light is obtained is preferably used.

Note that, when a transparent substrate formed of an optically active crystal such as quartz crystal is used, a grid-shaped convex portion is preferably arranged in a parallel direction or perpendicular direction to the optical axis of the crystal. Accordingly, superior optical characteristics are obtained.
[Polarizer]
The polarizer constituting the optical element of the present invention is a polarizer which has a wire grid structure, and preferably includes a transparent substrate, and a grid-shaped convex portion which is arranged on the transparent substrate at a pitch (cycle) shorter than a wavelength of light in a used bandwidth, and extends in a predetermined direction. Furthermore, the grid-shaped convex portion preferably includes at least a linear metal layer, a first dielectric layer, and an absorption layer, or a linear metal layer and a dielectric absorption layer, in that order starting on the transparent substrate side. Note that, unless detrimental to the effects of the present invention, the polarizer constituting the optical element of the present invention may also include layers other than the linear metal layer, the first dielectric layer, the absorption layer, and the dielectric absorption layer.

<Polarizer of First Embodiment>

The polarizer 101, constituting the optical element 100 which is an embodiment of the present invention illustrated in FIG. 1, has a grid-shaped convex portion arranged at a pitch shorter than a wavelength of light in a used bandwidth, and the grid-shaped convex portion includes the linear metal layer 17, the first dielectric layer 18, the absorption layer 19, and the second dielectric layer 20, in that order starting on the side of the transparent substrate 11. That is, the polarizer 101 has a wire grid structure in which the grid-shaped convex portion is arranged in a one-dimensional grid shape on the transparent substrate 11, the grid-shaped convex portion having the linear metal layer 17, the first dielectric layer 18, the absorption layer 19, and the second dielectric layer 20 laminated in that order starting on the side of the transparent substrate 11.

Here, as illustrated in FIG. 1, the direction (predetermined direction) in which the grid-shaped convex portion extends is called the Y axis direction. Furthermore, the direction orthogonal to the Y axis direction and in which the grid-shaped convex portion is arranged along the main face of the transparent substrate 11 is called the X axis direction. In this case, the light falling incident on the polarizer 101 falls incident on the side where the grid-shaped convex portion of the transparent substrate 11 is formed, ideally from a direction that is orthogonal to the X axis direction and Y axis direction.

The polarizer 101, which has a wire grid structure, utilizes four actions of transmission, reflection, interference, and light absorption, and thereby attenuates the polarized waves (TE waves (S waves)) having an electric field component that is parallel to the Y axis direction and transmits polarized waves (TM waves (P waves)) having an electric field component that is parallel to the X axis direction. Therefore, in FIG. 1, the Y axis direction is the direction of the absorption axis of the polarizer, while the X axis direction is the direction of the transmission axis of the polarizer.

Of the light that has fallen incident from the side where the grid-shaped convex portion of the polarizer 101 illustrated in FIG. 1 is formed, a high ratio of the polarized waves (TM waves (P waves)) passes through the linear metal layer 17. On the other hand, the polarized waves (TE waves (S waves)) are reflected by the linear metal layer 17. Some of the TE waves that have been reflected by the linear metal layer 17 are absorbed upon passing through the absorption layer 19, while some are reflected and return to the linear metal layer 17. The TE waves that have been reflected by the absorption layer 19 attenuate in the dielectric layer 18 through interference with the TE waves that have been reflected by the linear metal layer 17. As a result of the attenuation of the TE waves as described above, the polarizer 101 is able to obtain the desired polarization characteristics.

When the grid-shaped convex portion of the polarizer constituting the optical element of the present invention is viewed from the direction (predetermined direction) of extension of each one-dimensional grid, as illustrated in FIG. 1, that is, in a cross-sectional view orthogonal to the predetermined direction, the grid-shaped convex portion preferably includes the linear metal layer 17, the first dielectric layer 18, and the absorption layer 19.

In the polarizer constituting the optical element of the present invention, there are no particular limitations on the pitch of the grid-shaped convex portion as long as this pitch is shorter than the wavelength of working bandwidth light. From the perspective of ease of fabrication and stability, the pitch of the grid-shaped convex portion is preferably from 100 nm to 200 nm, for example. The pitch of the grid-shaped convex portion can be measured through observation using a scanning electron microscope or a transmission electron microscope. For example, the pitch at four optional points can be measured by using a scanning electron microscope or a transmission electron microscope, and the arithmetic mean value thereof can be taken as the pitch of the grid-shaped pconvex portion. This measurement method will be called the electron microscope method hereinbelow.

When the polarizer constituting the optical element of the present invention is viewed from the direction (predetermined direction: Y axis direction) of extension of the grid-shaped convex portion, the linear metal layer, the first dielectric layer and absorption layer, in the grid-shaped convex portion, preferably have substantially the same width.

(Linear Metal Layer)

The linear metal layer (the linear metal layer 17 in FIG. 1) is formed on one side of the transparent substrate, and a metal film that extends in a band shape is arranged in the Y axis direction, which is the absorption axis. Note that, in the present invention, another layer may also be present between the transparent substrate and the linear metal layer. For example, the polarizer 101 according to an embodiment of the present invention illustrated in FIG. 1 includes the third dielectric layer 16 between the transparent substrate 11 and the linear metal layer 17.

The metal film constituting the linear metal layer 17 of the polarizer 101 according to an embodiment of the present invention illustrated in FIG. 1 has a rectangular shape when viewed from the direction (predetermined direction: Y axis direction) of extension of the grid-shaped convex portion, that is, in a cross-sectional view that is orthogonal to the predetermined direction. However, there are no particular limitations on the shape of the metal film constituting the linear metal layer, and this shape can be suitably selected according to the objective. Possible cross-sectional shapes include a rectangle and trapezoid, for example.

The linear metal layer has a wire grid-type polarizer function, and reflects polarized waves (TE waves (S waves)) having an electric field component in a direction parallel to a direction (predetermined direction: Y axis direction) of extension of the grid-shaped convex portion, and transmits polarized waves (TM waves (P waves)) having an electric field component in a direction that is orthogonal to a direction (predetermined direction: X axis direction) of extension of the grid-shaped convex portion.

There are no particular limitations on the material constituting the linear metal layer as long as the material possesses reflectivity to working bandwidth light, and possible examples include simple substances such as Al, Ag, Cu, Mo, Cr, Ti, Ni, W, Fe, Si, Ge, and Te, or alloys containing one or more of such elements. Among the foregoing possible examples, the linear metal layer is preferably formed of aluminum or an aluminum alloy.

There are no particular limitations on the film thickness of the linear metal layer but, from the perspective of polarization characteristics, the film thickness is preferably in a range of 20 nm to 400 nm, and preferably at least 50% of the thickness of the grid-shaped convex portion. Note that the film thickness of the linear metal layer can be measured by the foregoing electron microscope method, for example.

(First Dielectric Layer)

The first dielectric layer (the first dielectric layer 18 in FIG. 1) is formed on the linear metal layer, and is arranged extending in a band shape in the Y axis direction, which is the absorption axis. Note that, in the present invention, another layer may also be present between the linear metal layer and the first dielectric layer.

In the polarizer 101 constituting the optical element 100 according to an embodiment of the present invention illustrated in FIG. 1, the first dielectric layer 18 of the grid-shaped convex portion has a rectangular shape when viewed from the direction (predetermined direction: Y axis direction) of extension of the grid-shaped convex portion, that is, in a cross-sectional view that is orthogonal to the predetermined direction.

The film thickness of the first dielectric layer is formed in a range where the phase of the polarized light reflected by the linear metal layer is shifted by a half wavelength relative to the polarized light reflected by the absorption layer. Specifically, the film thickness of the first dielectric layer is suitably configured in a range of 1 to 500 nm which enables the interference effect to be increased. The film thickness of the first dielectric layer can be measured by the foregoing electron microscope method, for example.

Possible examples of the material constituting the first dielectric layer include oxides of elements such as Si, Al, Be, Bi, Ti, Ta, and B, nitrides of elements such as Si and B, and fluorides of elements such as Mg or Ca. Such dielectric materials may be used alone or two or more may be used together. When two or more dielectric materials are used together, a mixture of two or more dielectric materials may be used, and dielectric materials which differ in a film thickness direction may be used. Among the foregoing dielectric materials, the first dielectric layer is preferably constituted by a Si oxide or an Al oxide, and particularly preferably by $SiO_2$ or $Al_2O_3$.

The refractive index of the first dielectric layer is preferably larger than 1.0 and no more than 2.5. The optical characteristics of the linear metal layer are also affected by the refractive index at the periphery thereof, and therefore polarization characteristics can be controlled by selecting the material of the first dielectric layer.

Furthermore, by suitably adjusting the film thickness and refractive index of the first dielectric layer, some of the TE waves which have been reflected by the linear metal layer can be reflected at the interface between the dielectric layer and the absorption layer and return to the linear metal layer, and the light reflected by the absorption layer and the light reflected by the linear metal layer can be attenuated by interference. As a result of the attenuation of the TE waves as described above, the desired polarization characteristics can be obtained.

(Absorption Layer)

The absorption layer (the absorption layer 19 in FIG. 1) is formed on the first dielectric layer, and is arranged extending in a band shape in the Y axis direction, which is the absorption axis. Note that, in the present invention, another layer may also be present between the first dielectric layer and the absorption layer.

In the polarizer 101 constituting the optical element 100 according to an embodiment of the present invention illustrated in FIG. 1, the absorption layer 19 in the grid-shaped convex portion has a rectangular shape when viewed from the direction (predetermined direction: Y axis direction) of extension of the grid-shaped convex portion, that is, in a cross-sectional view that is orthogonal to the predetermined direction.

Possible examples of the material constituting the absorption layer include one or more types of substance with a non-zero extinction coefficient and a light-absorbing action such as a metallic material or semiconductor material, and the material is suitably selected depending on the applicable light wavelength range. Possible examples of metallic material include simple substances such as Ta, Al, Ag, Cu, Au, Mo, Cr, Ti, W, Ni, Fe, and Sn, or alloys containing one or more of such elements. In addition, possible examples of semiconductor materials include Si, Ge, Te, ZnO, and silicide materials (B—$FeSi_2$, $MgSi_2$, $NiSi_2$, $BaSi_2$, $CrSi_2$, $CoSi_2$, TaSi, and the like). Such absorbent materials may be used alone or two or more may be used together. When two or more absorbent materials are used together, a mixture of two or more absorbent materials may be used, or absorbent materials which differ in a film thickness direction may be used. By using such absorbent materials, a high extinction ratio relative to the applicable visible light range is obtained for the polarizer. Among such absorbent materials, the absorption layer contains Fe or Ta, and is preferably constituted containing Si.

When a semiconductor material is used as the absorption layer, because the band-gap energy of the semiconductor is involved in the action of absorption, the band-gap energy must be at or below the working bandwidth. For example, when used with visible light, a material which exhibits absorption at wavelengths of 400 nm or more, that is, with a band gap of no more than 3.1 eV must be used.

There are no particular limitations on the film thickness of the absorption layer, and the film thickness can be suitably selected according to the objective, but a range of 1 nm to 100 nm is preferable, 5 nm to 80 nm is more preferable, and 10 nm to 50 nm is particularly preferable. The film thickness of the absorption layer can be measured by the foregoing electron microscope method, for example.

Note that the absorption layer can be formed as a high-density film by means of vapor deposition or sputtering. Furthermore, the absorption layer may also be configured from two or more layers of different constituent materials.

The width of the absorption layer in the grid-shaped convex portion may also be approximately the same as the width of the first dielectric layer, for example, which is located below the absorption layer. Note that these widths can be measured by the foregoing electron microscope method, for example.

<Polarizer of Second Embodiment>

A second embodiment of the polarizer constituting the optical element of the present invention is a configuration in which the grid-shaped convex portion includes a linear metal layer and a dielectric absorption layer, in that order starting on the transparent substrate side. That is, the polarizer has a wire grid structure in which the grid-shaped convex portion is arranged in a one-dimensional grid shape on the transparent substrate, the grid-shaped convex portion having at least the linear metal layer and the dielectric absorption layer laminated in that order, starting on the side of the transparent substrate.

The dielectric absorption layer of the polarizer according to the second embodiment is a layer that includes dielectric material and absorbent material.

Possible examples of the dielectric material contained in the dielectric absorption layer include oxides of elements such as Si, Al, Be, Bi, Ti, Ta, and B, nitrides of elements such as Si and B, and fluorides of elements such as Mg and Ca.

Such dielectric materials may be used alone or two or more may be used together. When two or more dielectric materials are used together, a mixture of two or more dielectric materials may be used, and dielectric materials which differ in a film thickness direction may be used.

Possible examples of the absorbent material contained in the dielectric absorption layer include metallic materials and semiconductor materials, and possible examples of metallic materials include simple substances such as Ta, Al, Ag, Cu, Au, Mo, Cr, Ti, W, Ni, Fe, and Sn, or alloys containing one or more of such elements. In addition, possible examples of semiconductor materials include Si, Ge, Te, ZnO, and silicide materials (B—$FeSi_2$, $MgSi_2$, $NiSi_2$, $BaSi_2$, $CrSi_2$, $CoSi_2$, TaSi, and the like). Such absorbent materials may be used alone or two or more may be used together. When two or more absorbent materials are used together, a mixture of two or more absorbent materials may be used, or absorbent materials which differ in a film thickness direction may be used.

The content ratios of dielectric material and absorbent material in the dielectric absorption layer may be varied in the film thickness direction. This variation enables the optical characteristics of the optical element to be improved. In addition, by adjusting the variation in the content ratio of the absorbent material, the wavelength at a minimum point of an absorption axis reflectance Rs can be adjusted. Note that from the perspective of further improving the optical characteristics of the optical element, the content ratio of the absorbent material in the dielectric absorption layer is preferably increased according to the separation from the linear metal layer. That is, for the dielectric absorption layer according to the second embodiment, the content ratio of the absorbent material preferably has a composition gradient that increases according to the separation from the linear metal layer.

<Optional Layers in Polarizer>

The polarizer constituting the optical element of the present invention may also include layers other than the linear metal layer, the first dielectric layer, the absorption layer, and the dielectric absorption layer. Optional layers will be explained hereinbelow.

(Second Dielectric Layer)

The polarizer constituting the optical element of the present invention may also include a second dielectric layer on the absorption layer or the dielectric absorption layer. The film thickness, material, refractive index and shape, and the like, of the second dielectric layer are the same as for the foregoing first dielectric layer.

The grid-shaped convex portion in the polarizer 101, which constitutes the optical element 100 which is an embodiment of the present invention illustrated in FIG. 1, includes the linear metal layer 17, the first dielectric layer 18, the absorption layer 19, and the second dielectric layer 20, in that order starting on the side of the transparent substrate 11. Further, the second dielectric layer 20 covers not only the grid-shaped convex portion of the polarizer 101, but also covers the whole of the surface of the polarizer 101. The inclusion of the second dielectric layer enables the metallic material serving as the constituent material of the grid-shaped convex portion to suppress advancement of an oxidation reaction beyond the extent required.

The second dielectric layer can be formed by using CVD (Chemical Vapor Deposition) and ALD (Atomic Layer Deposition), for example, on the surface of the polarizer (the side where the wire grid is formed).

(Water Repellent Layer)

In addition, the surface on the light-incidence side of the polarizer constituting the optical element of the present invention, that is, the surface of the second dielectric layer, may also be covered by a water repellent layer. The water repellent layer is preferably a layer that exhibits a contact angle of 900 or more, for example, when measured by means of the half-angle method using pure water.

There are no particular limitations on the material of the water repellent layer as long as the same is a substance that exhibits water repellency, but from the perspective of adhesion to the layer formed of dielectric material, the water repellent material is preferably a compound with a functional group exhibiting reactivity with hydroxyl groups, or the like, contained in the dielectric material or the dielectric material surface.

In addition, from the perspective of raising the contact angle and increasing water repellency, the water repellent material is preferably a compound with a long alkyl chain or long fluoroalkyl chain. Possible examples of such compounds include FDTS (perfluorodecyltriethoxysilane), FOPA (perfluoro-n-octylphosphonic acid), ODPA (octadecylphosphonic acid), and the like, but such compounds are not limited to the same.

The water repellent layer can be formed by using the foregoing CVD or ALD, for example.

(Diffusion Barrier Layer)

The polarizer constituting the optical element of the present invention may also include a diffusion barrier layer between the first dielectric layer and the absorption layer. In other words, taking the polarizer 101 illustrated in FIG. 1 as an example, the grid-shaped pconvex portion is configured to include the linear metal layer 17, the first dielectric layer 18, a diffusion barrier layer, and the absorption layer 19, in that order starting on the side of the transparent substrate 11. The inclusion of the diffusion barrier layer makes it possible to prevent diffusion of light in the absorption layer. The diffusion barrier layer can be constituted by a metal film of Ta, W, Nb, Ti, or the like.

(Third Dielectric Layer)

The polarizer constituting the optical element of the present invention may also include a third dielectric layer between the transparent substrate and the grid-shaped convex portion. The provision of the third dielectric layer enables heat resistance and moisture resistance to be improved. Note that the film thickness, material, refractive index, shape, and the like, of the third dielectric layer are the same as for the foregoing first dielectric layer.

The polarizer 101 constituting the optical element 100, which is an embodiment of the present invention illustrated in FIG. 1, has a third dielectric layer 16 between the transparent substrate 11 and the linear metal layer 17 constituting the grid-shaped convex portion. Further, provided on the third dielectric layer are the linear metal layer 17, the first dielectric layer 18, the absorption layer 19, and the second dielectric layer 20, which constitute the grid-shaped convex portion.

[Polarizer Fabrication Method]

The polarizer constituting the optical element of the present invention can be fabricated by undergoing a metal film formation step, a first dielectric film formation step, an absorption film formation step, and an etching step.

In the metal film formation step, a metal film which is to be the linear metal layer is formed, by means of a subsequent etching step, over the whole substrate surface on one side of the transparent substrate. In the first dielectric film formation step, a first dielectric film which is to be the first dielectric layer is laminated, by means of a subsequent etching step, on the whole surface of the metal film formed by the metal film formation step. In the absorption film formation step, an absorption film which is to be the absorption layer is laminated, by means of a subsequent etching step, on the whole surface of the first dielectric film formed by the first dielectric film formation step. In each of these formation steps, each film can be formed by means of sputtering or vapor deposition, for example. Note that, where necessary, fabrication may undergo a step of forming an optional layer.

In the etching step, by selectively etching the laminate body formed via each of the foregoing formation steps, a grid-shaped convex portion which is arranged on the transparent substrate at a pitch that is shorter than the wavelength of working bandwidth light is formed. Specifically, a one-dimensional grid-like mask pattern is formed by photolithography or nanoimprinting, for example. Furthermore, by removing the mask pattern after etching has been performed, a grid-shaped convex portion which is arranged on the transparent substrate at a pitch that is shorter than the wavelength of working bandwidth light is formed. Possible etching methods include dry etching which uses an etching gas corresponding to an etching target, for example.

According to the present invention in particular, isotropic etching and anisotropic etching are combined to vary the balance, thereby also enabling different widths for the linear metal layer, first dielectric layer, and absorption layer.

Note that the fabrication method for the polarizer constituting the optical element of the present invention may also include a step of covering the surface of the polarizer with a second dielectric layer formed of a dielectric. In addition, a step of covering the surface of the polarizer with a water repellent layer may also be included.

[Phase Difference Compensation Element]

The phase difference compensation element constituting the optical element of the present invention has a function for compensating the phase difference of light that is generated by the liquid crystal cell, and includes at least an optically anisotropic layer and a matching layer having a phase difference.

The phase difference compensation element 102 constituting the optical element 100 which is an embodiment of the present invention illustrated in FIG. 1 is formed on a side of the transparent substrate 11 opposite from the polarizer 101, and has the matching layer having a phase difference 15, the optically anisotropic layer 13, the protective layer 14, and the antireflection layer 12, in that order starting on the side of the transparent substrate 11.

[Optically Anisotropic Layer]

The optically anisotropic layer in the phase difference compensation element constituting the optical element of the present invention includes a plurality of birefringent films whereon inorganic material is deposited. The optically anisotropic layer and the matching layer having a phase difference are layers which have a function for phase difference compensation in the phase difference compensation element constituting the optical element of the present invention, and contribute toward an improved contrast.

The optically anisotropic layer 13 in the phase difference compensation element 102 illustrated in FIG. 1 is disposed between the matching layer having a phase difference 15 and the protective layer 14. The optically anisotropic layer 13 is a layer that includes a plurality of birefringent films.

The plurality of birefringent films contained in the optically anisotropic layer are films whereon inorganic material is deposited. The inorganic material is preferably a dielectric material, and possible examples thereof include oxides containing at least one element selected from a group consisting of Si, Nb, Zr, Ti, La, Ta, Al, Hf, and Ce. Furthermore, the principal component is preferably $Ta_2O_5$ and, more preferably, a material obtained by adding $TiO_2$ to $Ta_2O_5$ at 5 to 15% by mass.

There are no particular limitations on the fabrication method for the birefringent films contained in the optically anisotropic layer, but film deposition is preferably performed by means of oblique vapor deposition, for example. That is, the birefringent films contained in the optically anisotropic layer are preferably oblique vapor deposition films. Note that when a birefringent film is formed by means of oblique vapor deposition, the vapor deposition direction can be modified by causing the transparent substrate to rotate by a predetermined angle in the in-plane direction.

Figure 2:
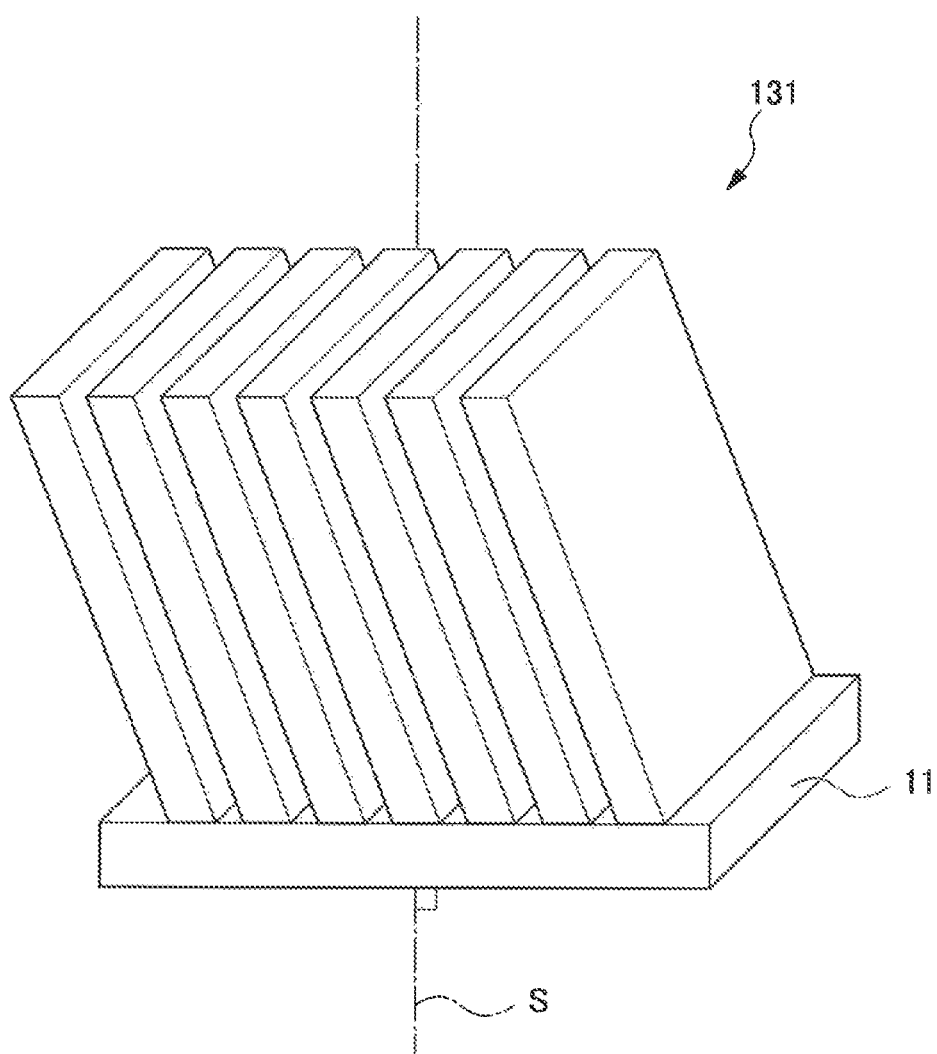
FIG. 2 is a perspective schematic diagram of a birefringent film of the present invention.

FIG. 2 is a perspective schematic diagram illustrating an embodiment of birefringent films contained in the optically anisotropic layer. As illustrated in FIG. 2, a birefringent film 131 which is contained in the optically anisotropic layer 13 is a film that is formed by being deposited in a direction that is oblique to a substrate normal S which is a direction (hereinafter called the substrate normal direction) orthogonal to the surface of the transparent substrate 11. The optically anisotropic layer in the phase difference compensation element constituting the optical element of the present invention has a configuration in which this birefringent film is repeatedly formed by changing the in-plane direction, and is thus deposited in a plurality.

That is, each of the birefringent films contained in the optically anisotropic layer is formed, by means of oblique vapor deposition, by being deposited in a direction that is oblique to the substrate normal of the transparent substrate, and the angle formed between the film formation direction of the inorganic material constituting the birefringent film and the surface of the transparent substrate is preferably not 90 degrees.

Figure 3:
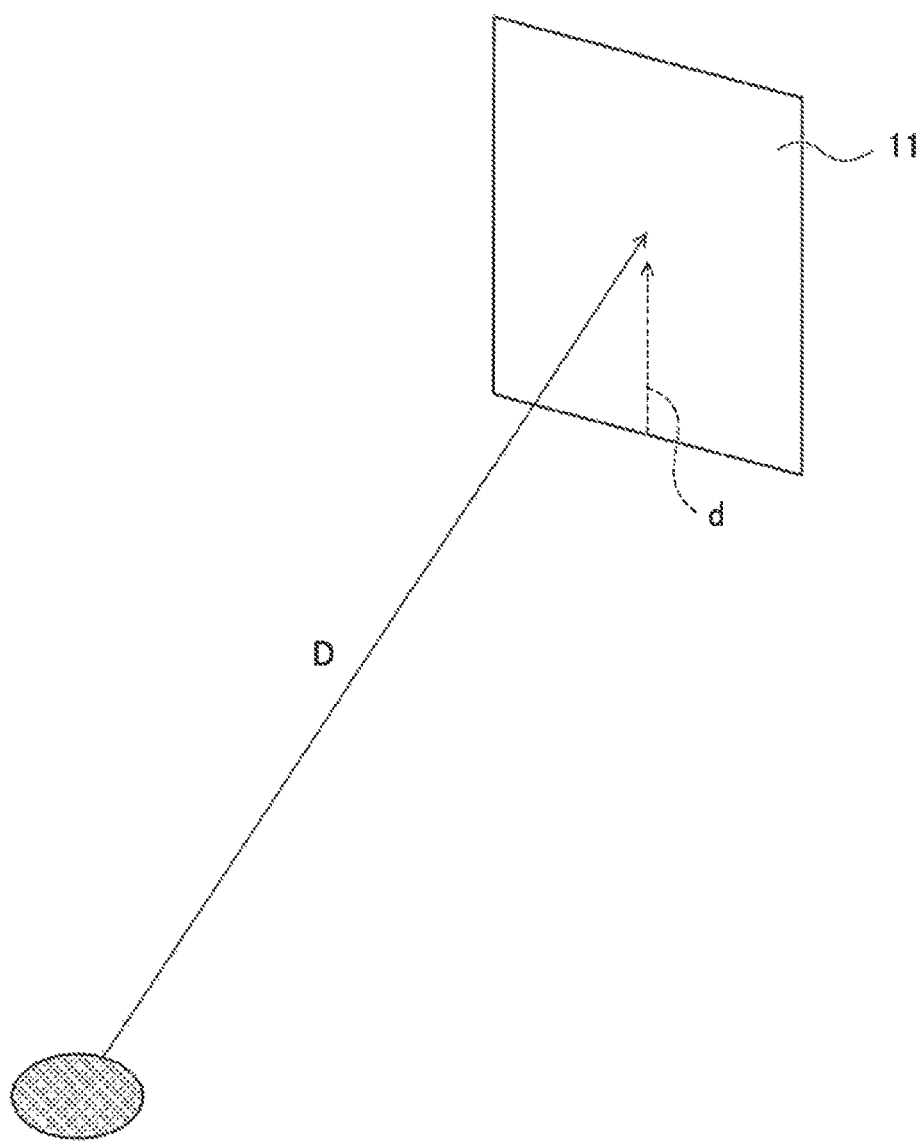
FIG. 3 is a diagram illustrating an orientation of a line segment that has been obtained by projecting a film formation direction of a birefringent film onto the surface of a transparent substrate.

FIG. 3 is a diagram illustrating an orientation of a line segment that has been obtained by projecting a film formation direction of a birefringent film formed by oblique vapor deposition onto the surface of a transparent substrate. When a birefringent film has been formed facing the transparent substrate 11 in a vapor deposition direction D from a vapor deposition source, the orientation of the line segment formed by projecting the film formation direction of the birefringent film onto the surface of the transparent substrate is denoted by d.

Note that the material and composition of the plurality of birefringent films contained in the optically anisotropic layer are the same. In addition, there are no particular limitations on the phase differences of each of the plurality of birefringent films, and the phase differences can be optimized according to the liquid crystal cell.

There are no particular limitations on the film thicknesses of each of the birefringent films contained in the optically anisotropic layer, and the film thicknesses can be optimized according to the liquid crystal cell. Note that the thickness (film thickness) of a layer in the present specification denotes the average film thickness.

There are also no particular limitations on the overall thickness of the optically anisotropic layer, and the overall thickness can be optimized according to the liquid crystal cell.

Note that the optically anisotropic layer in the optical element of the present invention is disposed on an opposite side (reverse side) from the side where the polarizer of the transparent substrate is provided, and is provided between the transparent substrate and the optically anisotropic layer so as to hold the matching layer having a phase difference (described subsequently) therebetween.

[Matching Layer Having a Phase Difference]

The matching layer having a phase difference is an essential layer in the phase difference compensation element constituting the optical element of the present invention. The matching layer having a phase difference is provided between the transparent substrate and the optically anisotropic layer.

The matching layer having a phase difference has an antireflection action at the interface between the transparent substrate and the optically anisotropic layer, and a C-plate action. That is, the matching layer having a phase difference is positioned to simultaneously perform a C-plate action, and antireflection at the interface between the transparent substrate and the optically anisotropic layer.

In the phase difference compensation element 102 illustrated in FIG. 1, the matching layer having a phase difference 15, the optically anisotropic layer 13, and the protective layer 14 are laminated in that order starting on the side of the transparent substrate 11, and the antireflection layer 12 is disposed as the outermost layer atop the protective layer 14.

Figure 4:
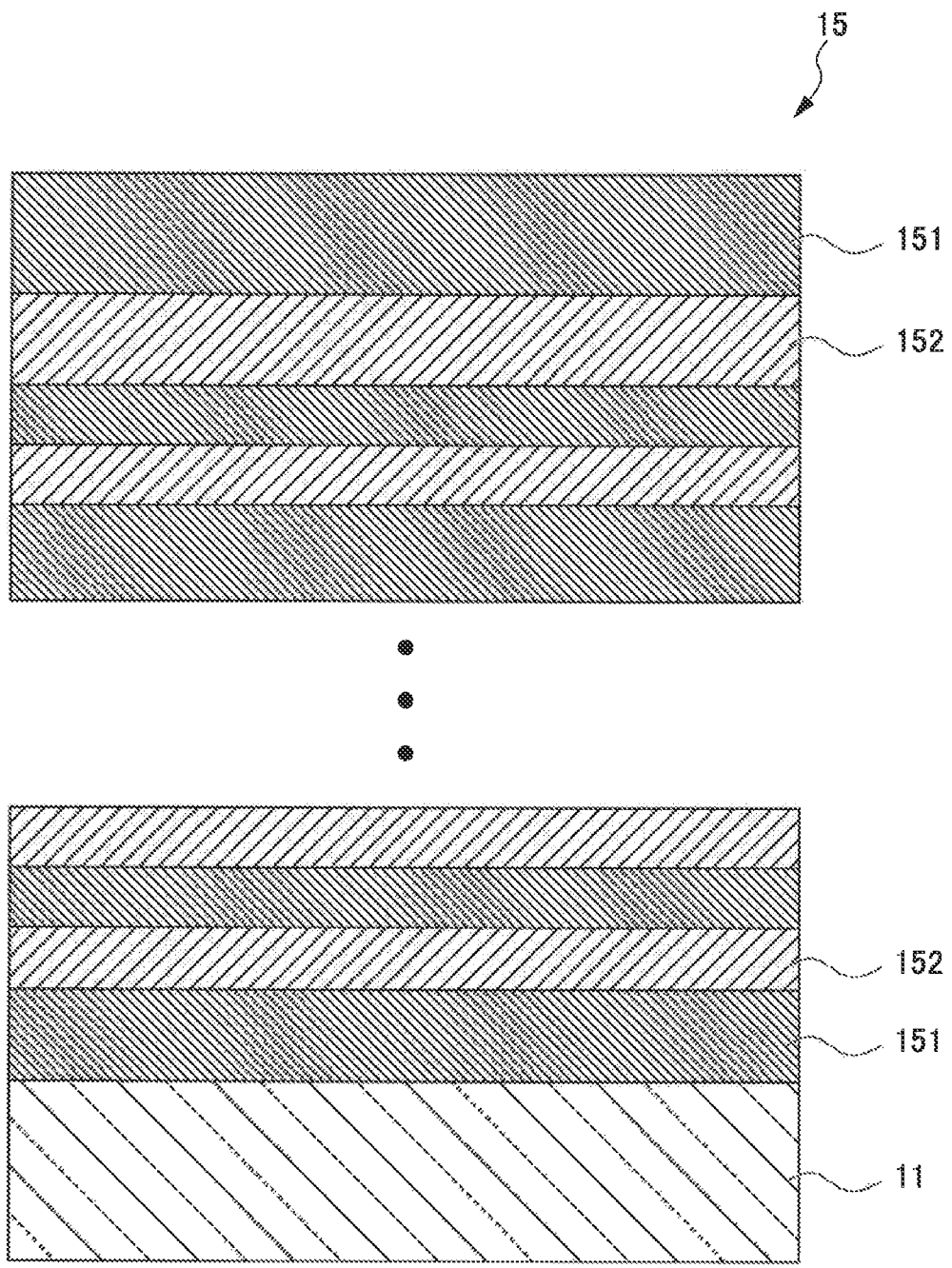
FIG. 4 is a cross-sectional schematic diagram of a matching layer having a phase difference according to an embodiment of the present invention.

The matching layer having a phase difference is preferably a dielectric film laminated body formed of dielectrics of two or more types having different refractive indices. FIG. 4 is a cross-sectional schematic diagram of a matching layer having a phase difference according to an embodiment of the present invention. The matching layer having a phase difference 15 illustrated in FIG. 4 is a multilayer film that is formed by laminating two types of dielectric film with different refractive indices. In this embodiment, the matching layer having a phase difference 15 is constituted by a dielectric multilayer film obtained by alternately laminating a first dielectric film 151 and a second dielectric film 152. There are no particular limitations on the number of layers, but possible examples include a dielectric multilayer film formed of a total of 34 layers obtained by alternately laminating the first dielectric film 151 and the second dielectric film 152.

As the materials forming the dielectric films, which constitute the matching layer having a phase difference and which are formed of dielectrics of two or more types having different refractive indices, possible examples of each material include inorganic oxides containing at least one oxide selected from a group consisting of $TiO_2$, $SiO_2$, $Ta_2O_5$, $Al_2O_3$, $CeO_2$, $ZrO_2$, $ZrO$, $Nb_2O_5$, and $HfO_2$. For example, in the matching layer having a phase difference 15 according to an embodiment illustrated in FIG. 5, the first dielectric film 151 is preferably formed by $Nb_2O_5$ which has a relatively high refractive index, and the second dielectric film 152 is preferably formed by $SiO_2$, which has a relatively low refractive index.

The matching layer having a phase difference is preferably designed such that the phase difference, imparted to oblique incident light which is inclined at 15 degrees to a direction (substrate normal direction) that is orthogonal to the surface of the transparent substrate, is from 1.0 to 25.0 nm. To establish a phase difference in this range, the film thicknesses of each of the dielectric films are made different and the number of laminated layers is optimized, thereby providing an antireflection action and imparting a phase difference to the incident light from an oblique direction, and consequently enabling a C-plate action to be realized. Furthermore, when the film thicknesses of each of the dielectric films differ, the number of laminated layers can be reduced in comparison with a case where the film thicknesses of the dielectric films are all the same. Therefore, the film thickness of the matching layer having a phase difference may be a film thickness that is required to obtain the desired phase difference, and is not particularly limited.

[Antireflection Layer]

The antireflection layer is provided according to requirements and is a layer that has an antireflection action in a desired working wavelength bandwidth. The antireflection layer is obtained by laminating dielectric films, for example, and the applicable dielectrics and number of layers can be suitably configured according to the required characteristics and productivity.

The antireflection layer 12 in the optical element 100 in FIG. 1 is provided as the outermost portion on the side where the optically anisotropic layer 13, the matching layer having a phase difference 15, and the protective layer 14 are provided.

[Protective Layer]

The protective layer is an optional layer in the optical element of the present invention, and is provided to prevent warpage of the optical element and improve moisture resistance of the optically anisotropic layer. There are no particular limitations on the material of the protective layer as long as the material enables the stress on the optical element to be adjusted and contributes to an improved moisture resistance. Possible examples include a thin film of $SiO_2$ or the like.

The protective layer 14 in the phase difference compensation element 102 in FIG. 1 is disposed between the optically anisotropic layer 13 and the antireflection layer 12. When the protective layer is provided, the same is preferably disposed on the optically anisotropic layer in the phase difference compensation element.

[Liquid Crystal Display Device]

The liquid crystal display device of the present invention includes a liquid crystal cell and the foregoing optical element of the present invention. In the present invention, the liquid crystal cell is preferably in a VA mode.

A VA-mode liquid crystal cell is a vertically oriented liquid crystal cell, and liquid crystal molecules in a voltage non-applied state are oriented obliquely in a fixed direction to the normal direction of the substrate surface. This oblique angle is called the pretilt angle.

According to the present invention, the contrast of the liquid crystal display device can be improved and an adequate optical compensation effect can be obtained simply by replacing the polarizing plate disposed on the incidence side or the emission side of the liquid crystal cell, with the optical element of the present invention.

[Projection-Type Image Display Device]

Furthermore, the projection-type image display device of the present invention includes a light source that emits light; a projection optical system that projects modulated light; and the foregoing liquid crystal display device which is disposed in an optical path between the light source and the projection optical system.

The light source emits light and possible examples thereof include an ultrahigh pressure mercury lamp which emits white light. The projection optical system projects modulated light, and possible examples thereof include a projection lens which projects modulated light onto a screen.

There are no particular limitations on the projection optical system as long as the same is a member that projects modulated light, and the same can be suitably selected according to the objective. Possible examples thereof include a projection lens which projects modulated light onto a screen.

The liquid crystal display device, which includes a VA-mode liquid crystal cell and the optical element of the present invention, is disposed in an optical path between the light source and the projection optical system.

According to the present invention, it is possible to improve polarization control and the contrast of the liquid crystal display device and realize space savings by replacing at least one of the two polarizing plates, which hold the liquid crystal cell therebetween, with the optical element of the present invention.

Note that the present invention is not limited to or by the foregoing embodiments, rather, modifications and improvements within the scope of achieving the object of the present invention are incorporated therein.

EXAMPLES

Examples of the present invention will be explained next, but the present invention is not limited to or by these examples.

Example 1

The optical element of the configuration illustrated in FIG. 1 was fabricated in Example 1.
[Fabrication of Polarizer]
(Formation of Third Dielectric Layer)
A third dielectric layer (A third dielectric layer 16 in FIG. 1) was formed by forming a $SiO_2$ film on one side of a glass substrate (average thickness: 0.7 mm) by means of sputtering.
(Formation of Metal Film)
Thereafter, a metal film was formed by forming an Al film on the third dielectric layer by means of sputtering.
(Formation of First Dielectric Film)
Thereafter, a first dielectric film was formed by forming a $SiO_2$ film on the metal film by means of sputtering.
(Formation of Absorption Film)
Thereafter, an absorption film was formed by forming Si on the first dielectric film by means of sputtering.
(Formation of Grid-Shaped Convex Portion)
Subsequently, a resist pattern was formed by coating the absorption film with a resist and carrying out exposure and development. Thereafter, a grid-shaped convex portion formed of a linear metal layer, a first dielectric layer, and an absorption layer was formed (the linear metal layer 17, first dielectric layer 18, and absorption layer 19 in FIG. 1) by performing etching with the resist pattern serving as a mask.
(Formation of Second Dielectric Layer)
Thereafter, a second dielectric layer (the second dielectric layer 20 in FIG. 1) was formed by forming a $SiO_2$ film over the whole surface where the grid-shaped convex portion was formed, by means of plasma CVD and using TEOS (tetraethoxysilane) gas and $O_2$.
(Formation of Water Repellent Layer)
Finally, a water repellent layer (not in FIG. 1), was formed on the second dielectric layer by taking FDTS (perfluorodecyltrichlorosilane) as the raw material.
[Fabrication of Phase Difference Compensation Element]
(Formation of Matching Layer Having a Phase Difference)
The matching layer having a phase difference (the matching layer having a phase difference 15 in FIG. 1) was formed by laminating 34 layers on the surface where the glass substrate polarizer is not fabricated, by means of sputtering and using $Nb_2O_5$ and $SiO_2$. The imparted phase difference was 7.0 nm for incident light inclined at a 150 tilt from the normal direction of the substrate.

(Formation of Optically Anisotropic Layer)
An optically anisotropic layer (the optically anisotropic layer 13 in FIG. 1) was formed by disposing a vapor deposition source on the matching layer having a phase difference, in a position inclined at a 70-degree tilt to the substrate normal direction, carrying out oblique vapor deposition, and forming two birefringent films, by taking a mixture of $Ta_2O_5$ and $TiO_2$ as the vapor deposition material.

Figure 5:
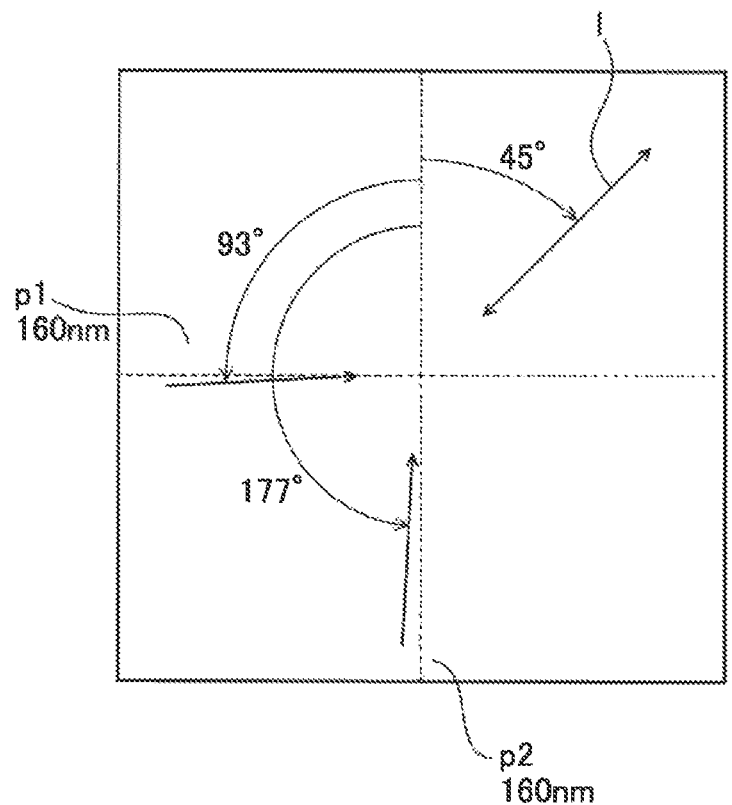
FIG. 5 is a diagram illustrating a film formation direction of a birefringent film of an Example 1.

FIG. 5 illustrates a film formation direction in an in-plane direction of each vapor deposition process. In the vapor deposition process 1, as illustrated in FIG. 5, when an xy axis is prescribed for the vapor deposition surface and a clockwise direction from the center is assumed to be positive, oblique vapor deposition was carried out from a direction of −93°, thus forming a birefringent film 1 with a film thickness of 160 nm. Thereafter, in a vapor deposition process 2, a birefringent film 2 with a film thickness of 160 nm was formed by carrying out oblique vapor deposition from a direction of −177°. Subsequently, annealing was performed at 300° C. to stabilize characteristics, and an optically anisotropic layer (the optically anisotropic layer 13 in FIG. 1) was formed.
(Formation of Protective Layer)
Thereafter, a protective layer (the protective layer 14 in FIG. 1) was formed by forming a $SiO_2$ film by means of plasma CVD and using TEOS (tetraethoxysilane) gas and $O_2$.
(Formation of Antireflection Layer)
Thereafter, an antireflection layer (the antireflection layer 12 in FIG. 1) was formed by alternately laminating 7 layers by means of sputtering and using $Nb_2O_5$ and $SiO_2$.

Comparative Example 1

An optical element, obtained by fabricating only the polarizer on one side of the glass substrate and not fabricating the phase difference compensation element, in Example 1, is taken as a Comparative example 1.
[Measurement of Contrast]
The contrast was measured for the optical elements of Example 1 and Comparative example 1. The average contrast of the optical element of Comparative example 1 was 398.8, whereas the average contrast of the optical element of Example 1 was 630.4.

EXPLANATION OF REFERENCE NUMERALS

100 Optical element
101 Polarizer
102 Phase difference compensation element
11 Transparent substrate
12 Antireflection layer
13 Optically anisotropic layer
131 Birefringent film
14 Protective layer
15 Matching layer having a phase difference
151 First dielectric film
152 Second dielectric film
16 Third dielectric layer
17 Linear metal layer
18 First dielectric layer
19 Absorption layer
20 Second dielectric layer
S Substrate normal
D Film formation direction of birefringent film d Orientation of line segment obtained by projecting film formation direction of birefringent film onto surface of transparent substrate
p1 Film formation direction of birefringent film 1
p2 Film formation direction of birefringent film 2
l Orientation of line segment obtained by projecting liquid crystal molecules onto the surface of transparent substrate

What is claimed is:

1. An optical element, comprising
a transparent substrate; and
a polarizer on one side of the transparent substrate, and comprising a phase difference compensation element on a side of the transparent substrate opposite from the polarizer,
wherein the polarizer comprises a wire grid structure, and comprises a grid-shaped convex portion that is arranged on the transparent substrate at a pitch shorter than a wavelength of light in a used bandwidth, the grid-shaped convex portion extending in a predetermined direction,
wherein the grid-shaped convex portion comprises a linear metal layer, a first dielectric layer, and an absorption layer, in that order starting on the transparent substrate side, and a whole of the surface of the grid-shaped convex portion is covered by a second dielectric layer,
wherein the phase difference compensation element comprises a matching layer having a phase difference and an optically anisotropic layer, in that order starting on the transparent substrate side,
wherein the matching layer having a phase difference is a dielectric film laminated body formed of dielectrics of two or more types having different refractive indices, and
wherein the optically anisotropic layer includes a plurality of birefringent films whereon inorganic material is deposited.

2. The optical element according to claim 1, wherein the first dielectric layer is a Si oxide or an Al oxide.

3. The optical element according to claim 1, wherein the grid-shaped convex portion comprises a dielectric absorption layer instead of the first dielectric layer and the absorption layer.

4. The optical element according to claim 1, wherein the linear metal layer is at least one element selected from a group consisting of Al, Ag, Cu, Mo, Cr, Ti, Ni, W, Fe, Si, Ge, Te and alloys formed of two or more thereof.

5. The optical element according to claim 1, wherein a water repellent layer is further provided on the second dielectric layer.

6. The optical element according to claim 1, wherein the birefringent films are oblique vapor deposition films.

7. The optical element according to claim 1, wherein the inorganic material is an oxide containing at least one element selected from a group consisting of Si, Nb, Zr, Ti, La, Ta, Al, Hf, and Ce.

8. The optical element according to claim 1, wherein the dielectric film comprises at least one oxide selected from a group consisting of $TiO_2$, $SiO_2$, $Ta_2O_5$, $Al_2O_3$, $CeO_2$, $ZrO_2$, $ZrO$, $Nb_2O_5$, and $HfO_2$.

9. The optical element according to claim 1, wherein the phase difference compensation element comprises the matching layer having a phase difference, the optically anisotropic layer, and an antireflection layer, in that order starting on the transparent substrate side.

10. The optical element according to claim 9, wherein the phase difference compensation element further comprises a protective layer between the optically anisotropic layer and the antireflection layer, wherein the protective layer comprises a SiO2 film.

11. The optical element according to claim 1, wherein the transparent substrate is one material selected from a group consisting of glass, quartz, quartz crystal, or sapphire.

12. A liquid crystal display device, comprising: a liquid crystal cell; and
the optical element according to claim 1.

13. A projection-type image display device, comprising:
a light source that emits light;
a projection optical system that projects modulated light; and
the liquid crystal display device according to claim 12 which is disposed in an optical path between the light source and the projection optical system.

14. The optical element according to claim 2, wherein the linear metal layer is at least one element selected from a group consisting of Al, Ag, Cu, Mo, Cr, Ti, Ni, W, Fe, Si, Ge, Te and alloys formed of two or more thereof.

15. The optical element according to claim 3, wherein the linear metal layer is at least one element selected from a group consisting of Al, Ag, Cu, Mo, Cr, Ti, Ni, W, Fe, Si, Ge, Te and alloys formed of two or more thereof.

* * * * *